(12) United States Patent
Hirouchi

(10) Patent No.: US 11,972,159 B2
(45) Date of Patent: Apr. 30, 2024

(54) IMAGE FORMING DEVICE AND METHOD OF CONTROLLING TO TRANSMIT PRINT DATA TO AN IMAGE FORMING DEVICE

(71) Applicant: CANON KABUSHIKI KAISHA, Tokyo (JP)

(72) Inventor: Yasuo Hirouchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/056,167

(22) Filed: Nov. 16, 2022

(65) Prior Publication Data

US 2023/0161523 A1    May 25, 2023

(30) Foreign Application Priority Data

Nov. 22, 2021 (JP) .................................. 2021-189215

(51) Int. Cl.
*G06F 3/12* (2006.01)

(52) U.S. Cl.
CPC ............ *G06F 3/123* (2013.01); *G06F 3/1209* (2013.01); *G06F 3/1287* (2013.01)

(58) Field of Classification Search
CPC ....... G06F 3/123; G06F 3/1209; G06F 3/1287
USPC ...................................................... 358/1.15
See application file for complete search history.

(56) References Cited

U.S. PATENT DOCUMENTS

| 9,565,053 | B2 * | 2/2017 | Kadota ................. G06F 3/1236 |
| 10,038,815 | B2 * | 7/2018 | Nakamura ......... H04N 1/00411 |
| 11,520,533 | B2 * | 12/2022 | Suzuki .................. G06F 3/1255 |
| 11,733,946 | B2 * | 8/2023 | Saito ..................... G06F 3/1285 |
| | | | 358/1.14 |
| 2012/0044508 | A1 * | 2/2012 | Park ...................... G06F 40/103 |
| | | | 358/1.6 |
| 2017/0163844 | A1 * | 6/2017 | Yagi .................... H04N 1/00965 |
| 2020/0089445 | A1 * | 3/2020 | Morimoto ............. G06F 3/1279 |
| 2020/0110562 | A1 * | 4/2020 | Nagahara ............... G06F 3/1236 |
| 2020/0310715 | A1 * | 10/2020 | Okuno .................. G06F 3/1285 |

FOREIGN PATENT DOCUMENTS

| JP | 2010102500 A | 5/2010 |
| JP | 2017105002 A | 6/2017 |

\* cited by examiner

*Primary Examiner* — Allen H Nguyen
(74) *Attorney, Agent, or Firm* — Canon U.S.A., Inc. IP Division

(57) ABSTRACT

An image forming device in the present application includes a reception unit configured to receive from an information processing device connected to the image forming device information representing a predetermined operating system operating in the information processing device, a setting unit configured to, in response to the reception unit receiving the information, set a structure of a USB device interface to be notified to the information processing device, and a notification unit configured to notify the information processing device of the structure of the USB device interface set by the setting unit.

9 Claims, 10 Drawing Sheets

FIG. 4

| Alternate # | EndPoint1 | EndPoint2 | EndPoint3 | EndPoint4 | Endpoint5 |
|---|---|---|---|---|---|
| | | Interface #1 | | Interface #0 | |
| #0 | | Legacy PDL I/F (Printer Class 7-1-2) | | Vendor Class I/F (Scan) | |
| #1 | | IPP Over USB (Printer Class 7-1-4) | | IPP Over USB (Printer Class 7-1-4) | |

| Alternate # | EndPoint1 | EndPoint2 | EndPoint3 | EndPoint4 | Endpoint5 |
|---|---|---|---|---|---|
| | | Interface #1 | | Interface #0 | |
| #0 | | Legacy PDL I/F (Printer Class 7-1-2) | | Vendor Class I/F (Scan) | |
| #1 | | | | | |

401
501
402
502

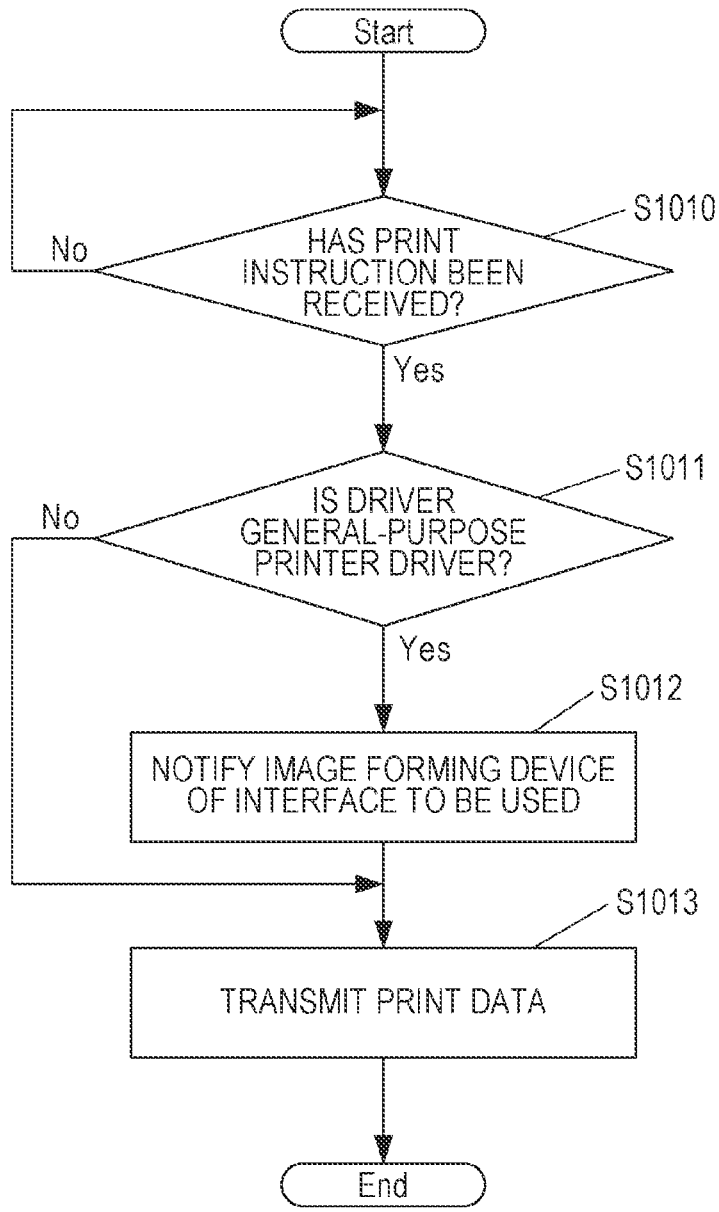

IMAGE FORMING DEVICE AND METHOD OF CONTROLLING TO TRANSMIT PRINT DATA TO AN IMAGE FORMING DEVICE

BACKGROUND

Field of the Disclosure

The present disclosure relates to an image forming device, a method of controlling an image forming device, and a program.

Description of the Related Art

An image forming device having a printing function (hereinafter abbreviated as an image forming device) is USB-connected to an information processing device and has the function of receiving print data generated by a printer driver installed in an information processing device via USB and printing the print data.

In the case where a printer driver is not installed in an information processing device connected to an image forming device, the information processing device installs a printer driver for the image forming device using a plug-and-play function on the basis of information acquired from the image forming device.

When an information processing device and an image forming device are connected via USB, processing called enumeration is performed. In the exchange of data called enumeration that is performed at the time of connection of an USB device without fail, the basic information about connected devices is exchanged. An information processing device acquires the identification information of a vendor that is a manufacturer of an image forming device and the identification information of a product in enumeration. The information processing device also acquires the USB I/F structure information of the image forming device. The information processing device can know whether the image forming device supports USB printing control using the Internet printing protocol (IPP) by acquiring the structure information of a USB I/F.

After completing the above-described enumeration processing, the information processing device acquires the HWID and CID of the image forming device using the printer class command of GET_DEVICE_ID. With the plug and play function, a printer driver for the image forming device is specified by referring to the acquired structure information of a USB I/F and the acquired HWID and CID and is installed in the information processing device. Japanese Patent Laid-Open No. 2017-105002 discloses that the installation of a driver in an information processing device that cannot use a general-purpose printer driver can be correctly completed by causing an image forming device to change the structure of a USB I/F to be notified to the information processing device.

There is a case where a driver that the vendor of an image forming device uploads to a driver distribution server is a printer driver that is usable and common in image forming devices of a plurality of types. At that time, an HWID is not described in the INF file of the printer driver and only a CID representing type information about the combination of the above-described multiple types of image forming devices is described in the INF file in some cases.

In plug and play in an operating system in the related art, a printer driver having an INF file in which the same HWID as an HWID acquired from an image forming device is written is retrieved in a driver distribution server first and a detected printer driver is installed. An operating system installed in an information processing device is hereinafter referred to as an OS. When there is not a printer driver having an INF file in which the same HWID as the HWID of an image forming device is written, a printer driver having an INF file in which the same CID as a CID acquired from the image forming device is written is retrieved. The information processing device installs the detected printer driver therein. When a printer driver cannot be relieved whose INF file includes the same HWID or CID as that of the image forming device, the information processing device determines whether the image forming device supports IPP printing via USB on the basis of the USB OF structure. When the image forming device supports IPP printing, the information processing device installs an IPP general-purpose driver. Accordingly, even when an HWID is not written in the INF file for a printer driver as described above, a printer driver provided by the vendor of an image forming device can be installed on condition that the CID of the image forming device and the CID written in an INF file match.

However, the installation priorities of drivers change depending on the version of an OS. In any version of OS, a printer driver having an INF file in which the same HWID as the HWID of an image forming device is written is retrieved. In the case of an OS of this version, the structure information of a USB I/F is referred to when a printer driver having an INF file in which the same HWID as the HWID acquired from an image forming device is written cannot be detected. An information processing device determines whether an IPP general-purpose driver is usable via USB and installs the general-purpose driver when the general-purpose driver is usable. When printing using a general-purpose driver cannot be performed, the information processing device retrieves a printer driver having an INF file in which the same CID as the CID acquired from the image forming device is written.

In the case of the certain version of an OS, a general-purpose driver is installed in preference to a printer driver having an INF file in which an HWID is not written as described above. A driver provided by the vendor of an image forming device therefore cannot be installed.

SUMMARY

An image forming device according to embodiments of the present disclosure includes a reception unit configured to receive from an information processing device connected to the image forming device information representing a predetermined operating system operating in the information processing device, a setting unit configured to, in response to the reception unit receiving the information, set a structure of a USB device interface to be notified to the information processing device, and a notification unit configured to notify the information processing device of the structure of the USB device interface set by the setting unit.

Further features of the present disclosure will become apparent from the following description of exemplary embodiments with reference to the attached drawings.

BRIEF DESCRIPTION OF THE DRAWINGS

FIG. 4 is a diagram illustrating an example of a USB I/F structure that an image forming device notifies an information processing device in the first embodiment.

FIG. 5 is a diagram illustrating an example of a USB I/F structure that the image forming device notifies an information processing device after reset processing in the first embodiment.

FIG. 10 is a flowchart illustrating a process performed when an information processing device according to an embodiment transmits print data to an image forming device.

DESCRIPTION OF THE EMBODIMENTS

First Embodiment

Embodiments of the present disclosure will be described below with reference to the accompanying drawings. The following embodiments do not limit the present disclosure. Not all of the combinations of the features described in the embodiments are essential to the solutions for the present disclosure.

Figure 1:
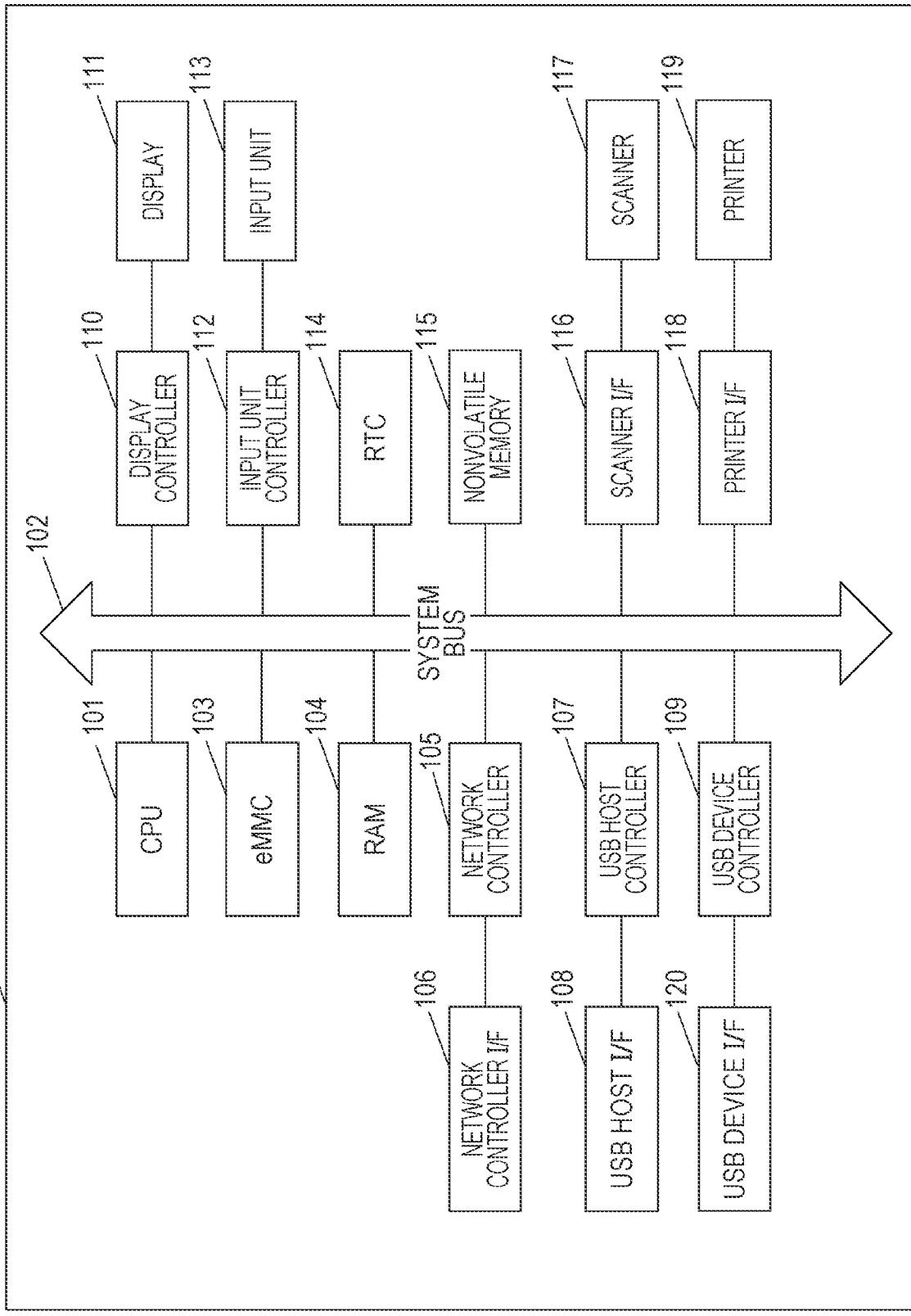
FIG. 1 is a diagram illustrating an exemplary hardware configuration of an image forming device according to an embodiment.

FIG. 1 is a diagram illustrating the hardware configuration of an image forming device 1. The configuration of the image forming device 1 will be described with reference to this drawing.

A central processing unit (CPU) 101 is a module that operates software for controlling the image forming device 1. A system bus 102 is a data bus that the CPU 101 uses to access another unit.

An embedded multi media card (eMMC) 103 is a storage unit that stores the software of the image forming device 1, a database required for the image forming device 1 to operate, and a temporary storage file. Although an eMMC is used as the storage unit in this embodiment, another storage unit such as a hard disk or an SSD may be used.

A random access memory (RAM) 104 is storage unit in which a program of the image forming device 1 is developed and which stores variables used for operating programs and data to be transferred from each unit by dynamic memory access (DMA).

A network controller 105 controls a network controller interface (I/F) 106 to control the communication between the image forming device 1 and another information processing device.

A USB HOST I/F 108 is used in the case where the image forming device 1 operates as a host and is controlled by a USB HOST controller 107. Examples of the case where the image forming device 1 operates as a USB HOST include the case where the connection to a USB memory is established and an image stored in the USB memory is printed and the case where a keyboard or card reader connected via USB is operated.

A USB DEVICE I/F 120 is used in the case where the image forming device 1 operates as a USB device and is controlled by a USB DEVICE controller 109. Examples of the case where the image forming device 1 operates as a USB device include the case where the image forming device 1 is connected to an information processing device 200, receives print data from the information processing device 200, and prints the print data.

A display 111 is a display unit for displaying the operating conditions of the image forming device 1 to allow, for example, a user to check the operating conditions. A display controller 110 performs the display control of the display 111.

An input unit 113 receives an input from a user and includes, for example, a touch panel, a keyboard, a numeric keypad, and a cursor key. An input unit controller 112 controls the input unit 113. A structure may be employed in which a touch panel is attached to the surface layer of the display 111 as the input unit 113.

A real time clock (RTC) 114 is a module to realize, for example, the clock function, alarm function, and timer function of the image forming device 1. A nonvolatile memory 115 is a rewritable nonvolatile recording medium and may be a static random access memory (SRAM), or an electrically-erasable programmable read-only memory (EEPROM).

A scanner 117 is a reading unit for reading an original and generating image data. A scanner I/F 116 is an interface for connecting the scanner 117 and the system bus 102.

A printer 119 is an image forming unit for forming an image on a sheet fed from a feeding tray or a feeding cassette. A printer I/F 118 is an interface for connecting the printer 119 and the system bus 102.

In this embodiment, the image forming device 1 is connected to the information processing device 200 via the USB DEVICE I/F 120.

Figure 2:
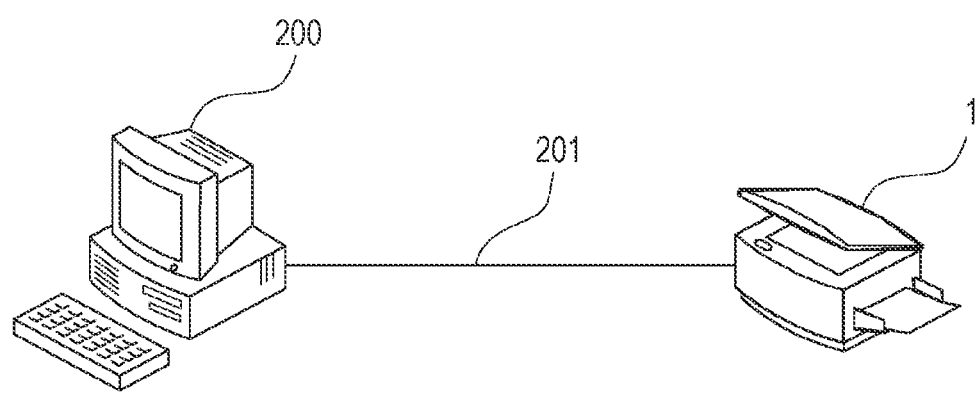
FIG. 2 is a diagram illustrating an example of an image forming system according to an embodiment.

FIG. 2 is a diagram illustrating a system configuration according to this embodiment. The image forming device 1 and the information processing device 200 are connected via a USB cable 201. In this embodiment, the information processing device 200 operates as a host device. The information processing device 200 may be any terminal such as a computer, a tablet, or a smartphone that is USB-connected to the image forming device 1. The information processing device 200 is connected to a printer driver distribution server for distributing a printer driver (not illustrated in FIG. 2) via a network. In the printer driver distribution server, a printer driver created by each printer vendor is registered and stored. Each printer driver stores an INF file in which information required for installation is written. In the INF file, the HWID (model information) of a printer supported by the printer driver and a CID that is the type information of the printer are written.

Figure 9:
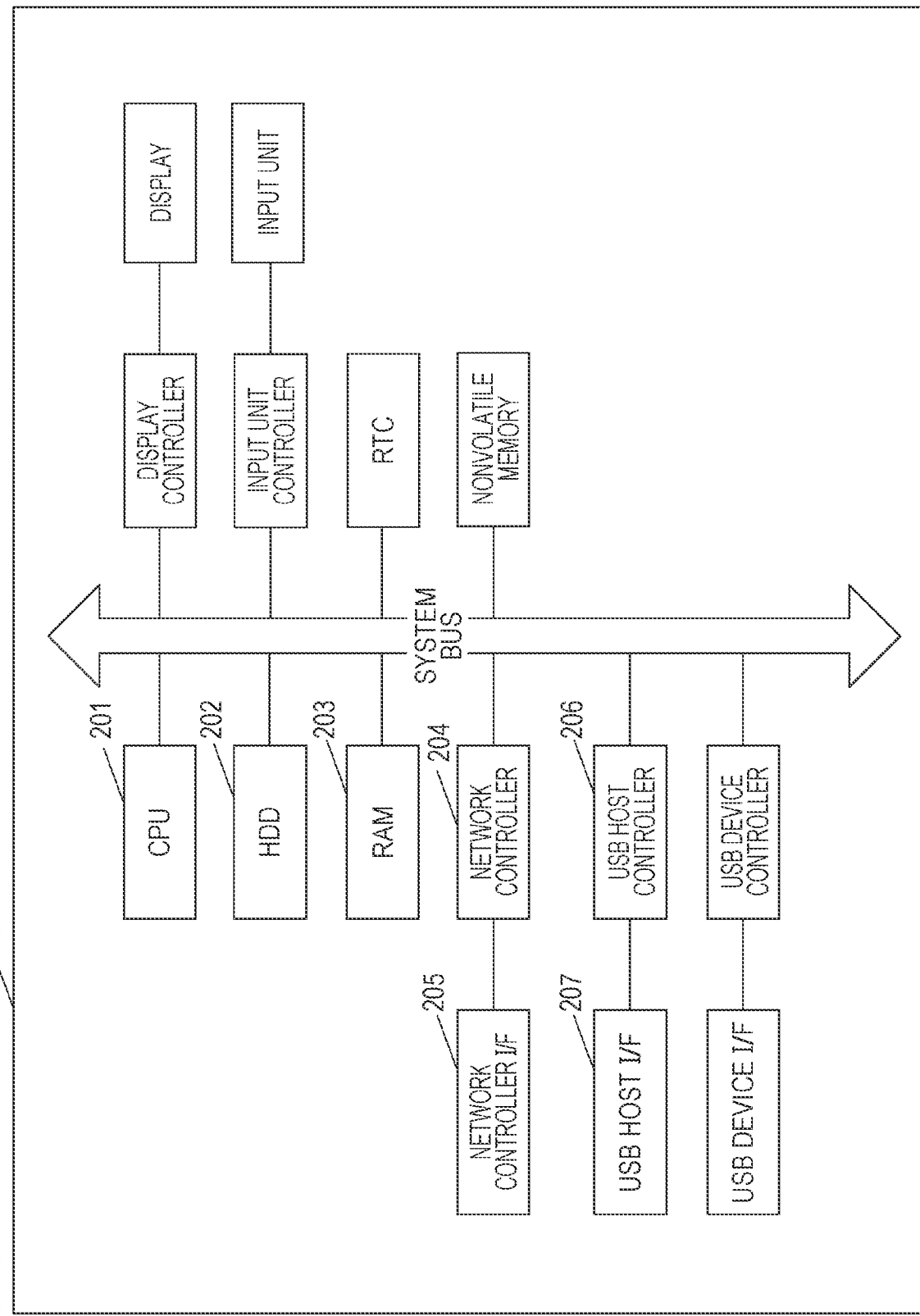
FIG. 9 is a diagram illustrating an exemplary hardware configuration of an information processing device according to an embodiment.

The hardware configuration of the information processing device 200 according to this embodiment will be described with reference to FIG. 9. FIG. 9 is a diagram illustrating an exemplary hardware configuration of the information processing device 200 according to an embodiment.

A CPU 201 is a control unit in the information processing device 200 and controls the whole of the information processing device 200. An HDD 202 is an example of a storage unit in the information processing device 200 and stores a program for controlling the information processing device 200 and data. An operating system (OS) of the information processing device 200 is also stored in the HDD 202. A RAM 203 is a storage unit used as a region where a program executed by the CPU 201 is developed. The RAM 203 is also used as a region where data is temporarily stored.

A USB HOST I/F 207 is an interface used when the information processing device 200 becomes a USB host. A USB HOST controller 206 controls the USB HOST I/F 207 when the information processing device 200 operates as a USB host device.

Figure 3:
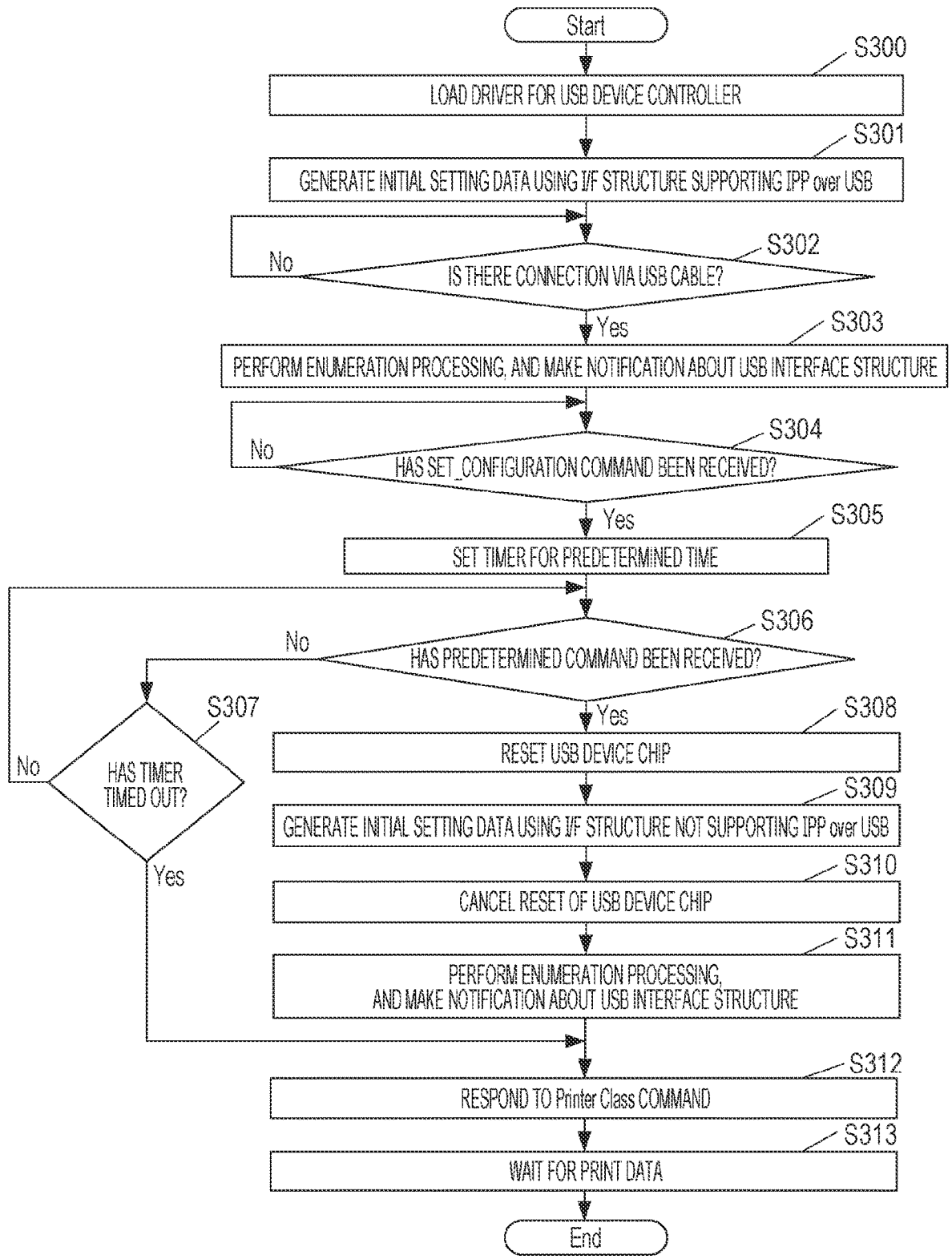
FIG. 3 is a flowchart illustrating an exemplary process performed by an image forming device in a first embodiment.

FIG. 3 is a flowchart illustrating an exemplary process performed by the CPU 101 in the image forming device 1 in this embodiment. A program for executing each processing is stored in the eMMC 103. The CPU 101 develops the program in the RAM 104 and executes the program.

When the image forming device 1 is powered on, the CPU 101 loads a driver for a controllable device into the RAM 104 via the USB DEVICE controller 109 (S300). By performing the processing of S300, the USB DEVICE controller 109 can control the device connected thereto using a driver suitable for the device.

The CPU 101 sets the structure information of the USB DEVICE I/F 120 for the RAM 104 (S301).

FIG. 4 is a diagram illustrating an example of the structure of a USB DEVICE I/F that the image forming device 1 sets at the time of startup. The image forming device 1 supports both a printer driver provided by a vendor and a general-purpose printer driver based on IPP provided by an OS vendor. In S301, the image forming device 1 therefore sets the I/F structure of a USB device illustrated in FIG. 4 for the RAM 104.

Here, the table for the I/F structure of a USB device illustrated in FIG. 4 will be described. The image forming device 1 has five end points. FIG. 4 illustrates the functions of the five end points. When EndPoint1 or EndPoint2 receives data, the received data is transmitted to a module for processing print data generated by a printer driver provided by a vendor as illustrated in FIG. 4. When EndPoint3, EndPoint4, or EndPoint5 receives data, data received by a USB device I/F is transmitted to a module for scanning as illustrated in FIG. 4.

A USB device driver included in the image forming device 1 according to this embodiment has an Alternate function. FIG. 4 also illustrates the function of capable of using the USB device driver as an Alternate. When an information processing device notifies the image forming device of the identification information of an Interface and the identification information of the Alternate function using a SetInterface command, the function set as the Alternate can be used. For example, it is assumed that the image forming device 1 receives the SetInterface command for specifying Interface #1 and #1 from the information processing device 200. After receiving this command, the image forming device 1 transmits data received from the information processing device 200 to a module that operates in accordance with the IPP and processes print data using a general-purpose print service. Thus, the operation of a USB device can change in response to the setting made by the information processing device 200.

That is, FIG. 4 illustrates that a Vendor Class I/F (Scan) 402 and a Legacy PDL I/F (Printer Class 7-1-2) 401 are provided on the Alternate #0 side. In the Printer Class 7-1-2, 7 represents a Printer Class, 1 represents a Printer Subclass, and 2 represents a Bi-directional Protocol.

FIG. 4 also illustrates that an IPP over USB I/F (Printer Class 7-1-4) 403 and an IPP over USB I/F (Printer Class 7-1-4) 404 are provided on the Alternate #1 side. In the Printer Class 7-1-4, 7 represents a Printer Class, 1 represents a Printer Subclass, and 4 represents the IPP over USB Protocol. The IPP over USB indicates that the reception of print data via USB can be performed using a predetermined protocol that is the Internet Printing Protocol.

Referring back to FIG. 3, the CPU 101 determines whether a USB device is connected to a USB port (S302). The CPU 101 monitors the voltage of a power supply line of the USB device and determines whether the voltage of the power supply line reaches a predetermined voltage. When the voltage reaches the predetermined voltage, the CPU 101 operates the signal line of the USB device to start communication with the information processing device 200. The CPU 101 repeatedly performs processing of S302 until a USB device is connected to the USB port of the information processing device 200.

When detecting the connection to the information processing device 200, the CPU 101 performs enumeration processing with the information processing device 200 (S303). The CPU 101 receives an enumeration command from the information processing device 200 and transmits a response to the command to the information processing device 200.

In S303, the information processing device 200 transmits a GET_DESCRIPTOR command of a CONFIGURATION type to the image forming device 1. Upon receiving the GET_DESCRIPTOR command, the image forming device 1 transmits the USB I/F structure information generated in S301. At that time, the image forming device 1 notifies the information processing device 200 of the interface structure indicating that the USB device driver supports the USB printing method based on the IPP illustrated in FIG. 4. As a result, the information processing device 200 can be notified that the image forming device 1 can receive print data that is generated by print service based on the IPP via USB and print the print data.

The CPU 101 determines whether a SET_CONFIGRATION command for making a connected USB device usable has been received from the information processing device (S304). The CPU 101 repeatedly performs the processing of S304 until receiving the SET_CONFIGURATION command. On the other hand, when receiving the SET_CONFIGRATION command, the CPU 101 sets a timer for measuring a predetermined time period (S305). The predetermined time period, which is generally a time period taken to receive a predetermined command issued by a predetermined OS, is one second in this embodiment, but does not necessarily have to be one second on condition that enumeration processing is completed in the predetermined time period.

The CPU 101 determines whether a predetermined command has received (S306). The predetermined command is a command transmitted by a predetermined OS having the plug and play function and is, for example, a GET_xx_DESCRIPTOR command.

The GET_xx_DESCRIPTOR command is transmitted without fail when the OS of an information processing device is made by a company A and is, for example, a command for transmitting the Compatible ID information of a scanner as a reply. The above-described predetermined command is not transmitted from an information processing device having an OS made by a company other than the company A. By determining whether the command has been received, it can be determined whether the OS of the information processing device 200 connected to the image forming device is the predetermined OS.

When it is determined in S305 that the predetermined command has not been received, the CPU 101 proceeds to S307. The CPU 101 determines whether the timer set in S305 has timed out (S307). When the timer has timed out, the CPU 101 proceeds to S312. On the other hand, when the timer has not timed out, the CPU 101 returns to S306 and determines whether the predetermined command has been received.

When it is determined in S306 that the predetermined command has been received, the CPU 101 performs Reset of the chip of the USB DEVICE controller 109 (S308). The CPU 101 resets the chip of the USB DEVICE controller by enabling Bit having the function of performing Hard Reset of a register in the USB DEVICE controller 109. When the USB DEVICE controller is reset, the information processing device 200 determines that it is disconnected from the image forming device 1. Furthermore, the USB I/F structure set in S301 can be changed when the USB DEVICE controller is reset. For Reset of the USB DEVICE controller 109, processing for disconnecting a power supply for the USB DEVICE controller 109 may be performed depending on a hardware configuration.

The CPU 101 sets the interface structure of the USB device (S309). At that time, the CPU 101 sets an interface structure not including information indicating that the image forming device 1 supports IPP over USB as illustrated in FIG. 5. FIG. 5 is a diagram illustrating an example of an interface structure generated by the image forming device 1 in S309. Since the image forming device 1 includes the scanner 117 and the printer 119, the Vendor Class I/F (Scan) 402 and the Legacy PDL I/F (Printer Class 7-1-2) 401 are provided on the Alternate #0 side. In S309, an IPP over USB I/F (Printer Class 7-1-4) is not provided on the Alternate #1 side as represented by 501 and 502. The image forming device 1 provides a notification for the information processing device 200 as if the image forming device 1 did not support IPP over USB. This prevents a printer driver for transmitting print data to the information processing device 200 using IPP over USB from being installed and also prevents a print queue for performing printing using the printer driver from being generated.

The CPU 101 cancels Reset of the chip of the USB DEVICE controller 109 (S310). In this embodiment, the CPU 101 cancels Reset of the USB DEVICE controller by disabling Bit having the function of performing Hard Reset of a register in the USB DEVICE controller 109. For cancellation of Reset of the USB DEVICE controller 109, processing for restarting the connection of a power supply to the USB DEVICE controller 109 may be performed depending on a hardware configuration. When Reset of the USB DEVICE controller 109 is cancelled, the information processing device 200 detects the connection of the image forming device 1 thereto and starts enumeration processing (S311). The CPU 101 transmits the USB I/F structure information illustrated in FIG. 5 as a response to the GET_DESCRIPTOR command of the CONFIGURATION type transmitted from the information processing device 200. Thus, the enumeration processing performed in S311 is the same as the enumeration processing performed in S303. However, the pieces of USB interface structure information that the image forming device 1 notifies the information processing device 200 in these pieces enumeration processing differ from each other as illustrated in FIGS. 4 and 5. Thus, when an OS operating in an information processing device is not a predetermined OS, the information processing device is notified of the interface structure indicating that an image forming device supports IPP over USB. On the other hand, when the OS is the predetermined OS, the information processing device is notified of the interface structure not indicating that an image forming device supports IPP over USB. As a result, a general-purpose printer driver can be prevented from being installed in an information processing device using the predetermined OS and is also allowed to be used in an information processing device using an OS other than the predetermined OS.

After the completion of the enumeration processing, the CPU 101 responds to a Printer Class command received from the information processing device 200 (S312). The Printer Class command is a command for acquiring a hardware ID (HWID) that is an identifier identifying the machine type of an image forming device to which the information processing device 200 is connected and a compatible ID (CID) representing the type of the image forming device. For example, the information processing device 200 transmits a GET_DEVICE_ID command that is one of the Printer Class commands. The CPU 101 receives the GET_DEVICE_ID command and transmits the response of "AAAA BB-ADV C1234 LIPSLX" as an HWID and the response of "CA_U_COLOR_X" as a CID.

Subsequently, the CPU 101 waits for print data from the information processing device 200 (S313).

Through the above process, the image forming device 1 can receive print data when the image forming device 1 and the information processing device 200 are USB-connected.

By performing the sequence illustrated in FIG. 3, the image forming device 1 can receive print data using an IPP-over-USB I/F when the information processing device 200 connected to the image forming device 1 use an OS other than the predetermined OS. On the other hand, when the information processing device 200 uses the predetermined OS, an IPP-over-USB interface is not used and an interface in the related art for receiving print data generated by a printer driver provided by a vendor is used.

Figure 8:
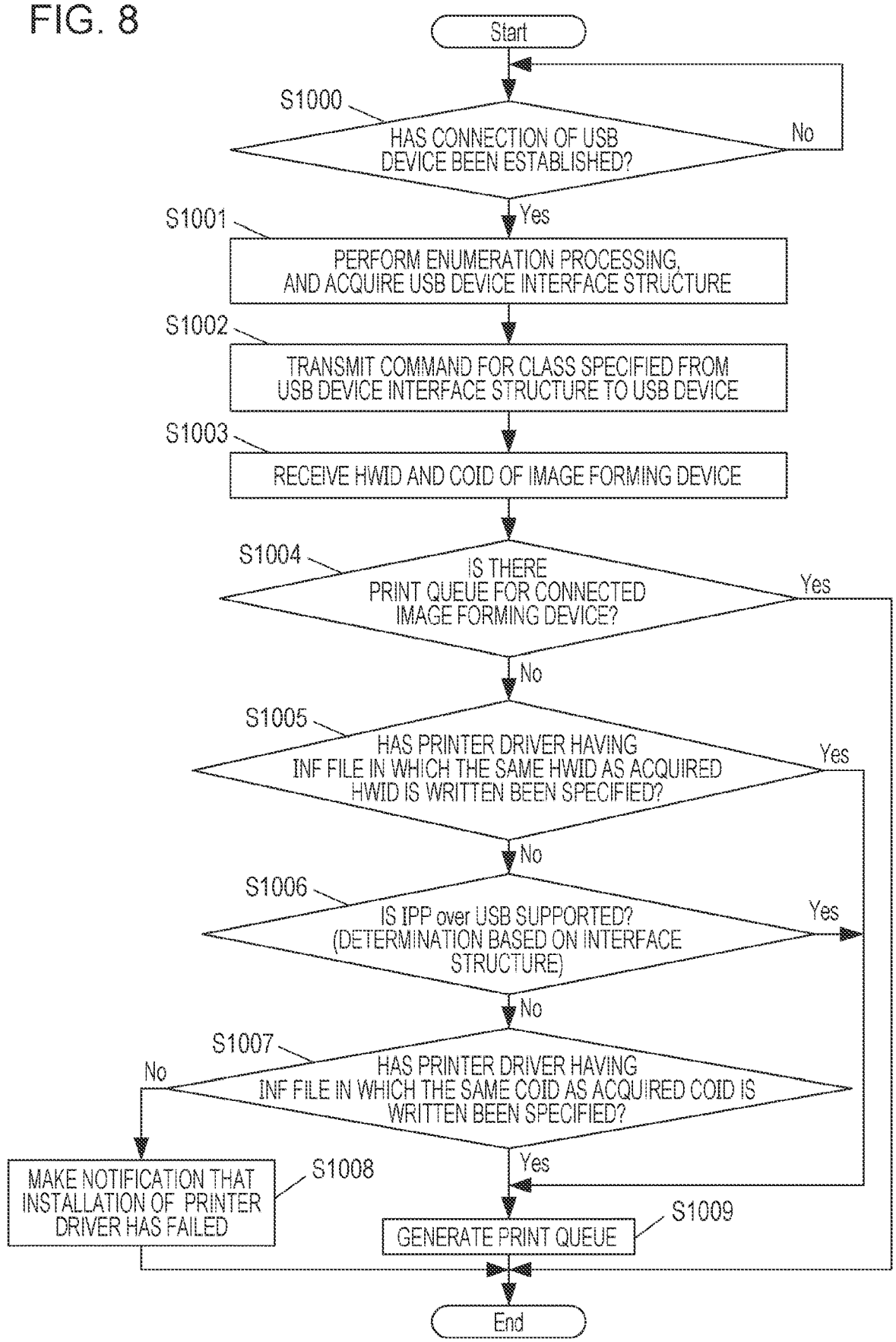
FIG. 8 is a flowchart illustrating a process performed by an information processing device according to an embodiment.

Next, the processing of the information processing device 200 USB-connected to the image forming device 1 will be described. FIG. 8 is a flowchart illustrating a process that the information processing device 200 performs when the information processing device 200 is connected to the image forming device 1. The process illustrated in FIG. 8 is performed in such a manner that, in the information processing device 200, a program stored in the HDD 202 is developed in the RAM 203 and the CPU 201 executes the program.

When the information processing device 200 is powered on, the process illustrated in FIG. 8 starts.

The CPU 201 determines whether the connection of a USB device has been established (S1000). For example, the CPU 201 monitors the voltage of a data line of the USB HOST I/F 207 and determines whether the connection of a USB device has been established on the basis of the value of the voltage. The CPU 201 repeatedly performs the processing of S1000 until the connection of a USB device is established. When the CPU 201 detects that a USB device has been removed after S1001, the CPU 201 returns to S1000 although not illustrated.

When detecting that the connection of a USB device has been established, the CPU 201 performs enumeration processing upon the connected USB device (S1001). The enumeration processing in S1001 is processing performed in S303 and S311 in FIG. 3. The CPU 201 acquires a USB Vendor ID and a USB Product ID using a GET_DESCRIPTOR command of a DEVICE type in S1001. The CPU 201 also acquires the USB DEVICE interface structure information of the image forming device 1 connected thereto using a GET_DESCRIPTOR command of a CONFIGURATION type. By acquiring the information, the information processing device 200 can know the class information of a USB device connected thereto, which function the USB device has, and whether the USB device supports IPP over USB.

After completing enumeration processing, the CPU 201 refers to the USB DEVICE interface structure information to specify the class of the USB device and transmits a command for the specified class to the USB device (S1002). Since the image forming device 1 of a printer class is connected to a USB HOST I/F in this embodiment, a GET_DEVICE_ID command that is one of Printer Class commands is transmitted to the image forming device 1. The CPU 201 receives the HWID and CID of the image forming device 1 (S1003). The HWID of the image forming device 1 is a character string between "MDL:" and ";" in a character string acquired as a response to the GET_DEVICE_ID command. The CID of the image forming device 1 is a character string between "CID:" and ";" in a character string acquired as a response to the GET_DEVICE_ID command. The pieces of processing of S1002 and S1003 correspond to the processing of S312 in FIG. 3.

The CPU 201 determines whether a print queue for transmitting print data to the image forming device 1 connected thereto via USB is stored in the information processing device 200 (S1004). When the print queue has already been generated, the CPU 201 ends the process illustrated in the flowchart in FIG. 8. On the other hand, when the information processing device 200 does not have the print queue for transmitting print data to the image forming device 1, the CPU 201 performs the process subsequent to S1005 to specify a printer driver for the image forming device 1 and generate a print queue.

The CPU 201 determines whether a printer driver having an INF file in which the same HWID as the HWID acquired in S1003 is written is specified (S1005). An INF file is used at the time of installation of a device driver. The CPU 201 accesses a driver folder locally stored in the information processing device 200 and a device driver distribution server to search for an INF file in S1005.

When there is a printer driver having an INF file in which the same HWID as the HWID acquired from the image forming device 1 is written, the CPU 201 proceeds to S1009. When there is not an INF file in which the same HWID as the HWID acquired from the image forming device 1 is written, the CPU 201 performs the processing of S1006.

The CPU 201 determines whether the image forming device 1 supports IPP over USB on the basis of the USB DEVICE interface structure information acquired in the enumeration processing in S1001 (S1006). When information representing IPP over USB is included in the USB DEVICE interface structure information illustrated in FIGS. 4 and 5, the CPU 201 determines that the image forming device 1 USB-connected thereto supports IPP over USB. When the connected image forming device 1 is a device supporting IPP over USB, the CPU 201 proceeds to S1009. On the other hand, when the image forming device 1 does not support IPP over USB, the CPU 201 determines whether a printer driver having an INF file in which the same CID as the CID acquired in S1003 is written is specified (S1007). The CPU 201 refers to the INF files of printer drivers locally stored in a driver folder in the information processing device 200 and the INF files of printer drivers stored in a driver distribution server to search for an INF file in which the CID notified by the image forming device 1 is written.

When an INF file in which the same CID as the CID notified by the image forming device 1 is written is not found, the CPU 201 determines that a printer driver could not be installed and makes a notification that the installation of a printer driver has failed (S1008). After the notification that the installation of a printer driver has failed, the process illustrated in FIG. 8 ends. When there is an INF file in which the same CID as the CID notified by the image forming device 1 is written, the CPU 201 proceeds to S1009.

The CPU 201 associates the printer driver specified in S1005, S1006, or S1007 and printer information with each other and generates a print queue for transmitting print data to the image forming device 1 (S1009). When the process proceeds from S1005 to S1009, the CPU 201 installs the printer driver specified in S1005, associates the installed printer driver and the information of the image forming device 1 with each other, stores them, and generates a print queue. When the process proceeds from S1006 to S1009, the CPU 201 installs a general-purpose printer driver that generates print data in accordance with the IPP and transmits the print data to an image forming device, associates the general-purpose printer driver and the information of the image forming device 1 with each other, and generates a print queue. A general-purpose printer drive is included in an OS in advance and can therefore be installed in the information processing device 200 without download via a network. When the process proceeds from S1007 to S1009, the CPU 201 associates a printer driver having an INF file in which the same CID as the CID of the image forming device 1 is written and the information of the image forming device 1 with each other and generates a print queue. After the completion of the process to S1009, print data can be transmitted from the information processing device 200 to the image forming device 1.

When there is not an INF file in which the same HWID as the HWID acquired from an image forming device in which a predetermined OS is installed and which supports IPP over USB is written, a general-purpose printer driver is installed in the information processing device as described above. Accordingly, by changing the USB device I/F structure information to be notified to an information processing device depending on an OS as illustrated in FIG. 3, the installation of a general-purpose printer driver can be prevented.

The above process is the process from the installation of a printer driver in the information processing device 200 to the generation of a print queue. There is the case where a printer driver provided by a vendor has more settable print setting items than a general-purpose printer driver created for a plurality of vendors and a plurality of machine types. However, since the information processing device 200 installs a printer driver as above, a general-purpose printer driver is installed when a printer driver with a conforming HWID is not found. When the information processing device 200 to be connected to the image forming device 1 has an OS that may execute the process illustrated in FIG. 8, the USB device interface information of the image forming device 1 is changed in this embodiment. As a result, the information processing device 200 determines that the image forming device 1 does not support a general-purpose printer driver, and the occurrence of the case can be suppressed where a printer driver with a conforming CID is not installed and a general-purpose printer driver is installed.

Next, a process when the information processing device 200 transmits print data to the image forming device 1 will be described with reference to FIG. 10. A program for executing the process illustrated in FIG. 10 is stored in, for example, the HDD 202, and the process is performed in such a manner that the program is developed in the RAM 203 and the CPU 201 performs the process.

The CPU 201 determines whether a print instruction has been received (S1010). When a user selects a print button on a print setting screen displayed on a display unit in the information processing device 200, a print instruction is input to the information processing device 200. The CPU 201 repeatedly performs the processing of S1010 until a print instruction is received. When the CPU 201 receives a print instruction, the CPU 201 determines whether a printer driver used for printing is a general-purpose printer driver (S1011). The CPU 201 refers to print queue information selected on the print setting screen. When a printer driver stored in association with a selected print queue is a general-purpose printer driver, the CPU 201 proceeds to S1012. On the other hand, when a printer driver stored in association with a selected print queue is not a general-purpose printer driver, the CPU 201 proceeds to S1013.

The CPU 201 notifies the image forming device 1 connected thereto of an interface to be used (S1012). The CPU 201 transmits a SetInterface command to the image forming device 1 to notify the image forming device 1 of information about an interface to be used and information about an alternate function to be used. This is processing for switching from processing performed by a USB device controller in the image forming device 1 to processing on the Alternate side.

The CPU 201 generates print data using a printer driver associated with the selected print queue and transmits the generated print data to the image forming device 1 using the print queue (S1013). In S1013, the CPU 201 refers to the USB device I/F structure received from the image forming device, specifies an Endpoint connected to a print module, and transmits data.

Through the above process, the information processing device 200 transmits print data to the image forming device 1.

Through the above process, the installation of a general-purpose printer driver is prevented when an image forming device capable of receiving print data generated by a general-purpose printer driver via USB and printing the print data is connected to an information processing device.

Second Embodiment

A configuration has been described in the first embodiment for always hiding the IPP over USB function when an OS operating in the information processing device 200 connected to the image forming device 1 is a predetermined OS. Accordingly, in the first embodiment, a general-purpose printer driver cannot be installed when the image forming device 1 is USB-connected to an information processing device in which the predetermined OS is installed.

In the second embodiment, a user can select whether a general-purpose printer driver is used when an information processing device in which the predetermined OS is installed is used.

In the second embodiment, it is set whether to use a general-purpose printer driver when an INF file in which the same HWID as the HWID of the image forming device 1 is written cannot be detected. When the image forming device 1 is connected to the information processing device 200, the USB device interface information is changed on the basis of this device setting.

The hardware configuration of the image forming device 1 illustrated in FIG. 1, the system configuration illustrated in FIG. 2, the hardware configuration of the information processing device 200 illustrated in FIG. 9 are common in the first and second embodiments, and the descriptions thereof will therefore be omitted.

Figure 6:
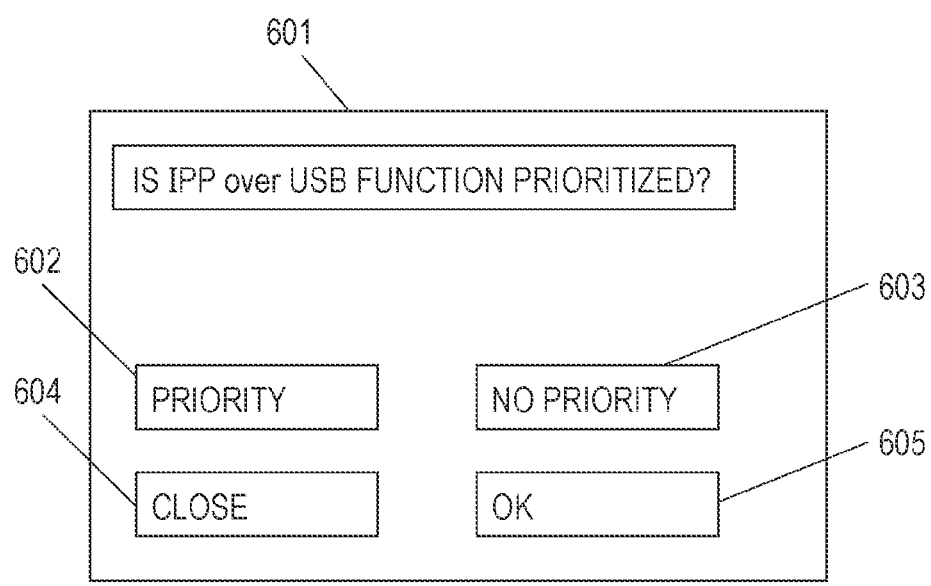
FIG. 6 is a diagram illustrating an example of a setting screen displayed by the image forming device in a second embodiment.

FIG. 6 is a diagram illustrating an example of a device setting screen displayed on the display 111 in a user mode.

On the screen illustrated in FIG. 6, a user can select whether to prioritize the IPP-over-USB printing. On a screen 601, objects with which a "priority" 602 and a "No Priority" 603 can be set are arranged. The selected object is highlighted in the display. The "No Priority" 603 is set by default.

In FIG. 6, the "priority" 602 is an object indicating that a general-purpose printer driver is installed when the information processing device 200 cannot detect a printer driver having an INF file in which the same HWID as the HWID of the image forming device 1 is written. The "No Priority" 603 is an object indicating that a general-purpose printer driver is not installed and a printer driver with a conforming CID is installed when a printer driver having an INF file in which the same HWID as the HWID of the image forming device 1 is written cannot be detected. A "close" 604 is an object for closing the screen 601 without updating the setting. An "OK" 605 is an object for setting a setting value for a selected one of the objects 602 and 603.

Figure 7:
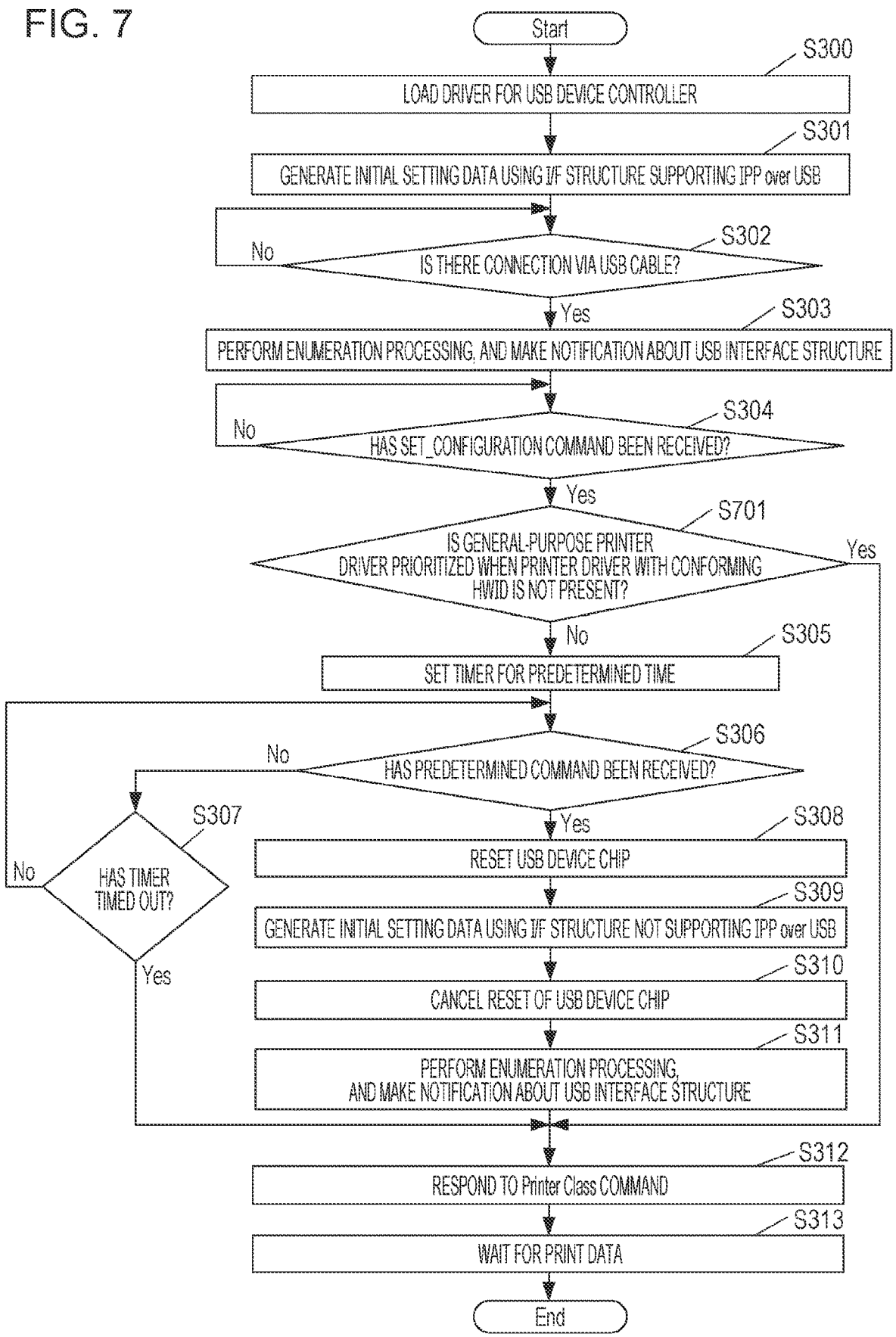
FIG. 7 is a flowchart illustrating an exemplary process performed by the image forming device in the second embodiment.

FIG. 7 is a flowchart illustrating a process performed by the image forming device 1 according to the second embodiment. The same processing as that described with reference to FIG. 3 is given the same reference numeral, and the description thereof will be omitted.

The CPU 101 determines whether the preferential use of a general-purpose printer driver when there is not a printer driver having an INF file in which the same HWID as the HWID of an image forming device is written is set (S701). When the "Priority" 602 is selected on the screen illustrated in FIG. 6, the CPU 101 proceeds from S701 to S312. On the other hand, when the "No Priority" 603 is selected on the screen illustrated in FIG. 6, the CPU 101 proceeds from S701 to S306.

By performing the processing of S701, the process proceeds without the processing for changing a USB interface structure when the installation of a general-purpose printer driver is given a higher priority than the installation of a printer driver with a conforming CID. As a result, a general-purpose printer driver can be installed when the information processing device 200 cannot detect a printer driver having an INF file in which the same HWID as the HWID of the image forming device 1 is written.

It is checked which of the "Priority" 602 and the "No Priority" 603 is set for "Is IPP-over-USB printing is prioritized?" on the screen 601 on the display 111 illustrated in FIG. 6. When the "Priority" 602 is selected as a result of the checking, the CPU 101 proceeds to S310. The process from S310 to S311 is the same as that described in the first embodiment, and the description thereof will be omitted. When the "No Priority" 603 is set in the determination in S701, the CPU 101 proceeds to S305. The process from S305 to S311 is the same as that described in the first embodiment, and the description thereof will be omitted.

Even when the "No Priority" 603 is set on the screen 601 illustrated in FIG. 6, the interface structure illustrated in FIG. 4 is notified when an OS installed in the information processing device is different from the predetermined OS. That is, only when the information processing device includes the predetermined OS, the USB I/F structure illustrated in FIG. 5, that is, the structure not including an IPP-over-USB I/F, is notified to the information processing device.

In the second embodiment, a user sets in advance whether to give a higher priority to the installation of a general-purpose printer driver than the installation of a printer driver with a conforming CID in the device setting when a printer driver with a conforming HWID cannot be detected. However, at the timing when the connection of an image forming device to an information processing device is detected, the screen illustrated in FIG. 6 may be displayed on the display 111 to allow a user to perform a device setting. Alternatively, at the timing when the connection of an image forming device to an information processing device is detected, the image forming device may cause the information processing device to display the information illustrated in FIG. 6 to receive a setting from a user.

When it is detected that the CPU 101 has received a predetermined command in S306 in FIG. 7, the screen illustrated in FIG. 6 may be displayed on the display 111. As a result, the comparison of a general-purpose printer driver with a printer driver having an INF file with a conforming CID and the setting of preferential installation of the general-purpose printer driver can be performed for each connected image forming device.

OTHER EMBODIMENTS

An image forming device described in this application allows an information processing device USB-connected thereto to install a printer driver provided by the vendor of the image forming device regardless of a version of an operating system operating in the information processing device.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-189215, filed Nov. 22, 2021, which is hereby incorporated by reference herein in its entirety.

What is claimed is:

1. An image forming device comprising:
one or more processors;
one or more memories storing executable instructions which, when executed by the one or more processors, causing the image forming device to perform operations including:
determining whether predetermined information has been received, wherein the predetermined information corresponds to an operating system of an information processing apparatus; and
transmitting first information about a USB device interface indicating that the USB device interface does not support an Internet Printing Protocol (IPP) over USB Protocol, in a case where the predetermined information has been received,
wherein the operating system installs a printer driver specified based on information about the image forming device according to the first information indicating the USB device interface does not support the IPP over USB Protocol, and the operating system installs a general-purpose printer driver according to second information indicating that another USB device interface supports the IPP over USB Protocol, the general-purpose printer driver generating print data to be transmitted according to the IPP.

2. The image forming device according to claim 1, wherein the operations further include:
transmitting the second information indicating that the another USB device interface supports the IPP over USB Protocol, before receiving the predetermined information.

3. The image forming device according to claim 1, wherein the operations further include resetting the USB device interface, in a case where it is determined that the predetermined information has been received from the information processing apparatus.

4. The image forming device according to claim 3, wherein the first information is transmitted to the information processing apparatus after the resetting.

5. The image forming device according to claim 1, further comprising:
a printer configured to print an image received from the information processing apparatus.

6. The image forming device according to claim 1, wherein the first information is not transmitted to the information processing apparatus in a case where it is determined that the predetermined information has not been received.

7. The image forming device according to claim 1, wherein the general-purpose printer driver is different from the printer driver and the printer driver is specified based on information indicating a model of the image forming device.

8. A method of controlling an image forming device, the method comprising:
determining whether predetermined information has been received, wherein the predetermined information corresponds to an operating system of an information processing apparatus; and
transmitting first information about a USB device interface indicating that the USB device interface does not support an Internet Printing Protocol (IPP) over USB Protocol, in a case where the predetermined information has been received,
wherein the operating system installs a printer driver specified based on information about the image forming device according to the first information indicating the USB device interface does not support the IPP over USB Protocol, and the operating system installs a general-purpose printer driver according to second information indicating that another USB device interface supports the IPP over USB Protocol, the general-purpose printer driver generating print data to be transmitted according to the IPP.

9. A non-transitory computer-readable medium storing one or more programs including instructions, which when executed by one or more processors of an image forming device, cause the image forming device to perform a method comprising:

determining whether predetermined information has been received, wherein the predetermined information corresponds to an operating system of an information processing apparatus; and transmitting first information about a USB device interface indicating that the USB device interface does not support an Internet Printing Protocol (IPP) over USB Protocol, in a case where the predetermined information has been received, wherein the operating system installs a printer driver specified based on information about the image forming device according to the first information indicating the USB device interface does not support the IPP over USB Protocol and the operating system installs a general-purpose printer driver according to second information indicating that another USB device interface supports the IPP over USB Protocol, the general-purpose printer driver generating print data to be transmitted according to the IPP.

* * * * *